United States Patent [19]

Kitchens et al.

[11] Patent Number: 4,567,241
[45] Date of Patent: Jan. 28, 1986

[54] MODIFICATION OF POLYMER SURFACES

[75] Inventors: John D. Kitchens; Leo R. Novak, both of Lake Jackson, Tex.

[73] Assignee: The Dow Chemical Company, Midland, Mich.

[21] Appl. No.: 713,519

[22] Filed: Mar. 20, 1985

Related U.S. Application Data

[63] Continuation-in-part of Ser. No. 619,515, Jun. 11, 1984, abandoned.

[51] Int. Cl.⁴ .............................................. C08F 8/32
[52] U.S. Cl. ................................ 525/352; 525/333.5; 525/333.9
[58] Field of Search ................... 525/352, 333.9, 333.5

[56] References Cited

U.S. PATENT DOCUMENTS 2,781,331  2/1957  Jones et al. .
3,350,362 10/1967  Potts .
3,607,536  9/1971  Bragole .
3,867,360  2/1972  Jones .

OTHER PUBLICATIONS

T. Nagamachi et al., J. Medicinal Chem. 17(4), 403–406 (1974).
R. C. Guy et al., Bulletin Chem. Soc. Japan. 50(2), 541–542 (1977).

Primary Examiner—Paul R. Michl
Attorney, Agent, or Firm—Douglas N. Deline

[57] ABSTRACT

Solid polymers having thiocyanate or isothiocyanate functionality added to reactive unsaturation thereof provide improved adhesive strength to laminates prepared therefrom, improved paint adhesion and other properties.

26 Claims, No Drawings

MODIFICATION OF POLYMER SURFACES

CROSS-REFERENCE TO RELATED APPLICATION

This is a continuation-in-part of Applicants' copending application Ser. No. 619,515 filed June 11, 1984 now abandoned.

BACKGROUND OF THE INVENTION

The present invention relates to polymeric modification. More particularly, the present invention relates to the modification of solid polymers containing unsaturation by reaction with thiocyano- or isothiocyanogenerating reactants so as to cause thiocyano or isothiocyano addition only on the available surface of such polymers.

In U.S. Pat. No. 3,607,536 to R. A. Bragole, a method for bonding resinous substrates such as polyethylene by radiation induced isocyanate modification thereof is disclosed. After being so modified, the resinous substrate may be easily bonded by adhesives capable of bonding to polyurethane or rubber surfaces.

In U.S. Pat. No. 2,781,331 diene polymers are thiocyanated by reaction with thiocyanogen. By reducing the level of unsaturation through hydrogenation the amount of thiocyanate moieties added to the polymer may be controlled. Similar techniques for thiocyanating ethylenically unsaturated polymers are disclosed in U.S. Pat. No. 2,287,774 and U.S. Pat. No. 3,867,360.

Previously known thiocyanation processes have resulted in addition of functionality throughout the polymer and consequent excessive use of thiocyanating agent. In addition, previously known processes have involved solution treatment of polymers making the procedure unsuited for use with solid polymeric objects such as molded materials. The procedure has been likewise unsuited for use with normally fully saturated polymers such as polyolefins.

SUMMARY OF THE INVENTION

According to the present invention, solid polymers containing reactive unsaturation are modified or functionalized by reaction with thiocyano or isothiocyano generating reactants by a process wherein the polymer (referred to as a precursor polymer) is contacted with a thiocyano or isothiocyano generating reactant so as to cause addition of at least some thiocyanate or isothiocyanate groups across the unsaturated double bonds. Preferably, the available reactive unsaturation is ethylenic unsaturation.

The invention further comprises the modified polymer prepared by the aforementioned process, i.e., a solid polymer containing unsaturation that is modified so as to contain thiocyanate or isothiocyanate functionality principally on the available surface thereof.

Even more particularly, the present invention comprises a solid polymer having a surface portion and an interior portion such that the surface portion comprises thiocyanate or isothiocyanate functionality and the interior portion is substantially devoid of thiocyanate or isothiocyanate functionality. Preferably, the solid polymer has been modified so that the surface thereof comprises thiocyanate or isothiocyanate functionality, the modification having taken place by addition of thiocyanate or isothiocyanate groups to a polymer containing at least some available unsaturation. As used herein, the term "surface portion" is defined as that portion of the polymeric solid which may be modified by the thiocyano or isothiocyano generating reactant upon contacting with such reactants in a liquid or gaseous reaction medium. The "interior portion" is defined as any remaining portion of the solid polymer. Preferably the surface portion extends no further than about 1.0 micron into the polymeric solid from a point of contacting with such reactant.

Modified polymers prepared in the manner of the present invention possess improved physical and chemical properties. By treatment according to the method of the present invention, the modified polymer's resistance to ultraviolet light may be improved over that of an unfunctionalized polymer, antistatic properties may be incorporated into polymers otherwise possessing little inherent antistatic properties, the dye acceptability of polymers may be altered, permeability of polymeric membranes may be tailored to provide the separation of desirable species from solutions, bonding of otherwise difficultly bondable polymers may be greatly facilitated, and subsequent finishing or treating processes including painting, metal deposition, plating, etc., of polymer surfaces may be improved.

DETAILED DESCRIPTION OF THE INVENTION

Polymeric materials suitable for modification according to the present invention include any polymeric material containing some amount of reactive unsaturation. The unsaturation may be present in the polymer as a consequence of its formation, as where a conjugated diene is polymerized or copolymerized resulting in the presence of residual unsaturation, or unsaturation may be purposely introduced for example by halogenation of the polymer followed by dehydrohalogenation according to known techniques. In addition the amount of unsaturation may be reduced if desired by controlled hydrogenation of a portion of such unsaturation prior to thiocyanation or isothiocyanation according to the present invention. The procedures of halogenation - dehydrohalogenation and hydrogenation are similar to procedures previously known in regards to non-polymeric organic chemical processes.

Examples of suitable polymers for use according to the present invention include addition polymers, i.e., polymers prepared by reaction of one or more ethylenically unsaturated monomers; ring-opened polymerization products, etc.; condensation polymers; or other suitable polymer. More particularly polymers that may be modified according to the present invention include polymers and copolymers of olefins and substituted olefins, monovinylaromatic monomers (with or without a divinyl copolymer), and ethylenically unsaturated carboxylic acids or esters thereof having up to about 12 carbon atoms. Optionally such copolymers may additionally include a diene monomer. Examples include polyethylene, polypropylene, copolymers of ethylene and one or more α-olefins, polyvinylchloride, copolymers of vinylidene chloride and at least one comonomer, polystyrene, polyvinyltoluene, polymethylmethacrylate, polybutylacrylate, polyvinylacetate, styrene/acrylic acid, ethylene/acrylic acid, styrene/maleic anhydride, styrene/acrylonitrile, styrene/butadiene, acrylonitrile/butadiene/styrene etc. Ring-opened reaction products include polyalkylene oxides, interpolymers of diglycidyl ethers, polyethyloxazoline, etc. Condensation polymers include polyesters, polyurethanes, polyamides, urea/formaldehyde thermosets, polyphenylene ethers, including ring alkylated or halogenated derivatives thereof, epoxy resins, interpolymers of dihydroxybiphenyl, polycarbonates, polysulfones, polyimides, silicone containing polymers, e.g., polydimethylsilane, etc. Also included are blends or mixtures of polymers with or without the presence of a compatibilizer. If not originally present, reactive unsaturation is incorporated into the above polymers by any suitable technique, most preferably by halogenation followed by dehydrohalogenation as previously described.

In the invention, solid objects of the above polymers containing reactive unsaturation are treated so as to incorporate thiocyanate or isothiocyanate functionality only on the available surface of such solid. In this manner, advantageous improvements in physical properties may be obtained without use of excessive amounts of thiocyano or isothiocyano generating reactant.

Preferred polymeric materials for use in one embodiment of the present invention are polyolefins, especially polyethylene suitably modified so as to contain unsaturation. When surface treated according to the present invention, solid polyethylene articles such as films or sheets have been found to be adherable to polymeric materials that are normally difficultly bondable. For example, polyethylene objects modified to contain ethylenic unsaturation then treated according to the present invention are readily bonded to other resinous objects such as polypropylene, polyamides, polyurethanes, polystyrene, etc. In a preferred embodiment, suitable bonding is achieved merely by contacting the two surfaces to be joined at elevated temperature optionally accompanied by pressure. Accordingly, one advantage of the present invention is that adhesive interlayers for joining differing polymeric materials such as those disclosed in previously mentioned U.S. Pat. No. 3,607,536, may be omitted when joining a modified polymer according to the present invention to another polymeric material.

Additionally, crosslinked polymers may be prepared by first modifying a polymer according to the present invention and subsequently processing the modified polymer so as to allow bond formation between neighboring thiocyanate or isothiocyanate moieties. For example modified polyolefins of the invention can be caused to crosslink by exposure to elevated temperatures and/or pressures. The resulting crosslinked polymer may be shown to possess improved dimensional stability and greater melt stability as evidenced by increased intrinsic viscosity of the compound. It is believed without wishing to be bound by such belief that such crosslinking results through the formation of disulfide, triazine, or dithioether functionality.

In another embodiment of the present invention, it is preferred to employ polyurethane thermosetting resins. Polymer coatings applied to reaction injection molded polyurethane articles that have been surface treated according to the present invention may demonstrate significantly improved adhesion compared to such coatings applied to untreated reaction injection molded polyurethane articles.

In still a further embodiment of the present invention, thin films or sheets of permeable polymeric materials such as polyolefins, polyvinyl chloride, vinylidene chloride copolymers, polystyrene, polyethers or polysulfones are modified to provide selective permeability to various materials, especially gases such as carbon dioxide, hydrogen cyanide, methane, sulfur dioxide, etc. In this manner, a membrane may be modified so as to selectively separate one or more gases from a mixture of gases. Alternatively, the polymers may be used to complex metal ions through the available thiocyanate or isothiocyanate functionality. Sheets of the modified polymer may be used to selectively extract such metal ions from aqueous streams.

The polymeric material treated according to the present invention may be in any suitable physical shape. Powders, chips, pellets, extrusions, films, as well as solid objects of considerable physical size and complex shape may be satisfactorily treated. Additional forming or machining operations such as pelletizing, stretching, extrusion, compaction, blowing, lamination, pull-trusion, spinning, foaming, painting, plating, vapor deposition or other finishing processes may be performed on polymeric materials modified by the present process.

The thiocyanate or isothiocyanate functionality may be incorporated into polymers according to the present invention, by either free radical or ionic charge transfer mechanisms, i.e., either by homolytic or heterolytic cleavage of an intermediate reactant capable of generating the desired free radicals or ions. Suitable intermediate reactants include thiocyanochloride, thiocyanobromide, thiocyanogen, thiocyanocyanate, thiocyanoisocyanate, etc. Preferably thiocyanate generating intermediate reactants, i.e., thiocyanating agents, are employed and the group added to the polymer is a thiocyanate group.

The preferred method of operation is to generate the above thiocyano or isothiocyano generating reactant in situ in a dilute solution. When so prepared substantially contemporaneously with use in the present treatment process, losses due to decomposition or polymerization of the radical or ion generating reactant are minimized. The reactant may be prepared by any suitable technique or obtained commercially. Suitable methods of preparation include oxidation of thiocyanic acid with manganese dioxide or other oxidizing agent; the action of bromine or chlorine on solutions of metal or ammonium salts of thiocyanic acid or isothiocyanic acid; the electrolysis of ammonium salts such as ammonium thiocyanate, etc. In addition, certain salts, such as ammonium thiocyanate, cupric thiocyanate, etc., may decompose spontaneously in the presence of the polymer to be modified thereby eliminating the need of additional agents to prepare the thiocyano or isothiocyano generating reagent in situ.

In the preparation of the modified polymers of the present invention, the thiocyano or isothiocyano radical-generating reactant or thiocyanate or isothiocyanate ion generating reactant (referred to as an intermediate reactant) is preferably prepared by contacting a metal salt of thiocyanic acid or isothiocyanic acid with a halogen. Suitable metal salts include lead thiocyanate, sodium thiocyanate, potassium thiocyanate, etc. Suitable halogens include chlorine and bromine. The polymeric substance to be modified may be present in the solution at the time of contacting the halogen and metal salt, or added at a suitable later tlme. The aotive speoies prepared in the above manner may be thiocyanogen, thiocyanogen halide, isothiocyanogen halide or a mixture thereof.

The thiocyano or isothiocyano free radical may be prepared from the intermediate reactant by any suitable technique including the use of chemical reactants, e.g., peroxides; or by the use of electromagnetic radiation;

heat; or other suitable means. A preferred method for preparing free radicals is to employ controlled amounts of light of a frequency sufficient to cause free radical formation. Generally, light falling into the general description of ultraviolet or visible radiation is sufficiently energetic to initiate free radical formation. Any suitable source of light may be employed such as mercury lights, electric arcs, sunlight, lasers tuned to a suitable wavelength, flash tubes, etc. A photosensitizer such as an aromatic quinone, halogenated hydrocarbons or other known sensitizers may be employed for efficient generation of thiocyano or isothiocyano free radicals. The photosensitizer may be used in minor or major amounts. Generally, as little as about 1 percent by weight is effective. Where a halocarbon photosensitizer is employed, large amounts may be employed. In such event, the photosensitizer is also employed as the solvent for the process.

In an ionic process the thiocyanate or isothiocyante ions are generated by any suitable method including chemical or electrochemical methods. Chemical methods include the use of oxidizing agents such as chlorine or other halogen, permanganate, etc, or a suitable catalyst. Exemplary catalysts are Lewis acids, especially halogens or the well-known metal halides, such as aluminum trichloride, ferric chloride, etc.

The process may be conducted in an inert liquid such as acetic acid, anhydrous ether or more preferably a halohydrocarbon or halocarbon such as dichloromethane, chloroform, tetrachloromethane, 1,2-dichloroethane, 1,1,2-trichloroethane, 1,1-dichloroethane, 1,1,1-trichloroethane, etc. Desirably the inert liquid does not result in dissolution or substantial swellinq of the solid polymer. An inhibitor to prevent polymerization of thiocyanate or isothiocyanate moieties may also be included if desired.

Generally, temperatures from about 0° C. to about 75° C. may be employed for the functionalizing process. Reduced or ambient temperatures are preferred in order to minimize decomposition losses of the thiocyanate or isothiocyanate reactant. A preferred temperature is from about 20° C. to about 50° C.

The amount of thiocyanate or isothiocyanate functionality incorporated into the polymer may vary depending on the nature of the polymer, the thiocyanating or iosthiocyanating agent, temperature, length of reaction, etc. At least a minor amount of thiocyanate or isothiocyanate functionality is added to the polymer. By the term "a minor amount" is meant that the amount of functionality added is at least an amount effective to provide altered physical properties in the polymer. Examples of suitable means to determine the existence of altered physical properties include the measure of adhesive strength of laminates formed therefrom; the gas permeability or paint adhesion of treated samples compared to untreated samples; increased intrinsic viscosity compared to unmodified samples or other suitable test. Preferably, from about 0.001 percent to about 10 percent by weight and most preferably, from about 0.01 percent to about 1 percent based on unfunctionalized polymer of thiocyanate or isothiocyanate functionality is added. Because the added functionality is concentrated at the available surface of the solid polymer, even a small added amount of thiocyanate or isothiocyanate functionality is effective to provide greatly altered physical properties.

SPECIFIC EMBODIMENTS

Having described the invention, the following example is provided as further illustrative and is not to be construed as limiting inasmuch as variations and modifications within the scope of the present invention will be readily apparent to the skilled artisan.

EXAMPLE 1

Thiocyanation of Polyethylene Powder

In a one liter resin kettle one gram of liquid bromine is placed in an open beaker. A sheet of linear low density polyethylene film in the form of a cylindrical surface is placed around an ultraviolet fluorescent light tube in the center of the resin kettle. The film is irradiated for 4 hours with long wave length ultraviolet light while being exposed to bromine vapors.

Following bromination the film is dehydrohalogenated by contacting with 1 N methanolic sodium methoxide at 20° C. for 15 minutes. The resulting film containing unsaturated moieties is thiocyanated by immersion in 0.2 N solution of thiocyanogen chloride at 40° C. The thiocyanating solution is prepared by placing 0.01 mole of lead thiocyanate in 200 ml of $CCl_4$. Chlorine gas is introduced with agitation into the solution while cooling in an ice bath over a 10 minute period. The chlorine gas is discontinued and the resulting solution filtered. After introduction of the polyethylene film into the solution the film and solution are irradiated with long wavelength ultraviolet light for about 30 minutes. The film is removed and rinsed with carbon tetrachloride then dried at room temperature.

Analysis of the film surface by ESCA indicates the presence of sulfur atoms (1.5 percent on a molar basis). Determination of the oxidation state indicates about 53 percent of the sulfur exists as thiocyanate moieties the remainder as sulfonate groups. Similar anaylsis for nitrogen containing groups indicates that 59 percent exist as thiocyanate groups and 41 percent are in the form of amide groups.

Samples of the treated unsaturated film are easily bonded to nylon or polypropylene films by simple application of heat and pressure (175° C., 275 kPa, 1 sec contact time). The laminated films prepared by this procedure demonstrate greatly improved adhesion compared to unmodified films.

What is claimed is:

1. A solid polymer having a surface portion and an interior portion such that the surface portion comprises thiocyanate or isothiocyanate functionality and the interior portion is substantially devoid of thiocyanate or isothiocyanate functionality wherein the thiocyanate functionality is incorporated into the polymer by addition to reactive unsaturation of the solid polymer.

2. A solid polymer according to claim 1 wherein the surface portion extends no further than about 1.0 micron into the solid polymer.

3. A solid polymer according to claim 1 wherein the unsaturation is ethylenic unsaturation.

4. A solid polymer according to claim 3 wherein the ethylenic unsaturation is incorporated into the polymer by halogenation followed by dehydrohalogenation.

5. A modified polymer according to claim 1 wherein the polymer prior to modification comprises an addition polymer or condensation polymer.

6. A modified polymer according to claim 5 wherein the polymer prior to modification comprises a polymeric or copolymeric addition product of one or more ethylenically unsaturated monomers; a ring opened reaction product; a polyester, a polyurethane, a polyamide, a polyether, a polycarbonate, a polysulfone, a polyimide, a silicone polymer, or a mixture thereof.

7. A modified polymer according to claim 6 wherein the polymer prior to modification comprises a homopolymer or copolymer of one or more monomers selected from the group consisting of olefins, substituted olefins, monovinyl aromatics, ethylenically unsaturated carboxylic acids and esters thereof.

8. A modified polymer according to claim 7 wherein the polymer prior to modification is polyethylene; polypropylene; a copolymer of ethylene and one or more α-olefins; polyvinyl chloride; a copolymer of vinylidene chloride and at least one comonomer; polystyrene; polyvinyltoluene; polymethyl methacrylate; polybutylacrylate; polyvinylacetate; styrene/acrylic acid; styrene/maleic anhydride; styrene/acrylonitrile; or ethylene/acrylic acid.

9. A modified polymer according to claim 4 wherein the amount of thiocyanate or isothiocyanate functionality added to the polymer is from about 0.001 percent to about 10 percent by weight.

10. A modified polymer according to claim 9 wherein the amount of thiocyanate or isothiocyanate functionality added to the polymer is from about 0.01 percent to about 1 percent by weight.

11. A modified polymer according to claim 1 prepared by contacting a precursor polymer having at least some reactive unsaturated moieties with a thiocyano or isothiocyano generating reactant so as to cause addition of at least some thiocyanate or isothiocyanate groups to the reactive unsaturation.

12. A modified polymer according to claim 11 wherein the precursor polymer is contacted with a thiocyanating agent.

13. A modified polymer according to claim 12 wherein the thiocyanating agent is prepared by contacting a metal thiocyanate with halogen in solution.

14. A modified polymer according to claim 13 wherein the metal thiocyanate is lead thiocyanate.

15. A modified polymer according to claim 12 wherein the polymer is contacted with a solution of the thiocyanating agent while simultaneously irradiating the polymer surface with ultraviolet light.

16. A composition of matter comprising a solid polymer according to claims 1, and a dissimilar polymer bonded to the surface thereof.

17. A composition of matter according to claim 16 wherein the dissimilar polymer is bonded to the surface of the solid polymer without an adhesive interlayer.

18. A process for modifying a solid polymer in order to incorporate thiocyanate or isothiocyanate functionality therein comprising contacting a solid precursor polymer having at least some reactive unsaturation with a thiocyanate or isothiocyanate reactant so as to cause addition of at least some thiocyanate or isothiocyanate groups thereto.

19. A process according to claim 20 wherein the precursor polymer is contacted with a thiocyanating agent.

20. A process according to claim 20 wherein the thiocyanating agent is prepared by contacting a metal thiocyanate with halogen in solution.

21. A process according to claim 22 wherein the halogen is chlorine or bromine.

22. A process according to claim 20 wherein a halocarbon solvent is present.

23. A process according to claim 20 wherein the metal thiocyanate is lead thiocyanate.

24. A process according to claim 20 wherein the polymer is contacted with a solution of the thiocyanating agent while simultaneously irradiating the polymer with ultraviolet light.

25. A solid polymer according to claim 1 wherein the thiocyanate or isothiocyanate functionality is incorporated into the polymer by contacting a thiocyano or isothiocyano free radical or ion generating reactant with the unsaturated solid polymer under free radical or ion generating conditions.

26. A process according to claim 18 wherein the thiocyanate or isothiocyanate and solid precursor polymer are contacted under free radical or ion generating conditions.

* * * * *

UNITED STATES PATENT AND TRADEMARK OFFICE
CERTIFICATE OF CORRECTION

PATENT NO. : 4,567,241
DATED : January 28, 1986
INVENTOR(S) : John D. Kitchens; Leo R. Novak It is certified that error appears in the above-identified patent and that said Letters Patent is hereby corrected as shown below:

At Column 4, line 61, "tlme" should read --time--.

At Column 4, line 61, "aotive" should read --active--.

At Column 4, line 61, "speoies" should read --species--.

At Column 5, line 19, "isothiocyante" should read -- isothiocyanate--.

At Column 5, line 47, "iosthiocyanating" should read --isothiocyanating--.

At Column 6, line 38, "anaylsis" should read --analysis--.

At Column 8, line 6, "claims" should read --claim--.

Signed and Sealed this

Seventeenth Day of February, 1987

Attest:

DONALD J. QUIGG

*Attesting Officer*  *Commissioner of Patents and Trademarks*